US008825788B2

(12) United States Patent
Stefani et al.

(10) Patent No.: US 8,825,788 B2
(45) Date of Patent: *Sep. 2, 2014

(54) METHOD AND APPARATUS FOR THE COLLECTION, FORMATTING, DISSEMINATION, AND DIPLAY OF INFORMATION ON LOW-COST DISPLAY DEVICES

(75) Inventors: Rolf R. Stefani, West River, MD (US); James Gary Cooper, Jr., Annapolis, MD (US)

(73) Assignee: ARINC Incorporated, Annapolis, MD (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/789,626

(22) Filed: May 28, 2010

(65) Prior Publication Data
US 2011/0072076 A1 Mar. 24, 2011

Related U.S. Application Data

(60) Provisional application No. 61/244,286, filed on Sep. 21, 2009, provisional application No. 61/346,264, filed on May 19, 2010.

(51) Int. Cl.
*G06F 15/16* (2006.01)
*G08G 1/00* (2006.01)
*H04N 7/18* (2006.01)

(52) U.S. Cl.
USPC ............ 709/208; 725/75; 340/901; 701/410

(58) Field of Classification Search
None
See application file for complete search history.

(56) References Cited

U.S. PATENT DOCUMENTS

| 4,975,696 | A | * | 12/1990 | Salter et al. | 340/973 |
|---|---|---|---|---|---|
| 6,208,935 | B1 | * | 3/2001 | Yamada et al. | 701/410 |
| 7,243,024 | B2 | | 7/2007 | Endicott | |
| 7,280,825 | B2 | * | 10/2007 | Keen et al. | 455/431 |
| 8,214,864 | B2 | * | 7/2012 | Emoto et al. | 725/75 |
| 2010/0179756 | A1 | * | 7/2010 | Higgins et al. | 701/210 |
| 2012/0001029 | A1 | * | 1/2012 | Kondo et al. | 246/108 |

OTHER PUBLICATIONS

AIS Industrial Innovations; Digital Signage; Breathing Life Into Your Media with Vibrant Dynamic Content; Irvine, CA.
CONRAC; High Performance Displays; Airport Solutions; TEC CONRAC Technology; www.conrac.ru/images/cat/lin/2.pdf; 2007.

* cited by examiner

*Primary Examiner* — Wen-Tai Lin
(74) *Attorney, Agent, or Firm* — Ronald E. Prass, Jr.; Prass LLP

(57) ABSTRACT

A display data management unit that receives and formats data and sends the formatted data to one or more low-cost display units for display to at least one of passengers and customers is disclosed and may include a communication interface that facilitates the sending and receiving of travel data, and a display content management unit that receives travel data through the communication interface that contains travel-related content from one or more data sources, determines which travel-related content is to be displayed on each particular low-cost display unit, determines in what format the travel-related content is to be displayed on each particular low-cost display unit, formats the travel-related content for display, and sends the formatted travel-related content to one or more low-cost display units through the communication interface for display to one of passengers and customers.

14 Claims, 11 Drawing Sheets

140

DEPARTURES BWI

10:05

| Destination | Airline | Flight | Sched | Est | Remarks | Gate Term |
|---|---|---|---|---|---|---|
| Hebron | Airline 1 | 6007 | 11:25 | 11:25 | On Time | C5 |
| Hebron | Airline 2 | 6007 | 11:25 | 11:25 | On Time | C5 |
| Hebron | Airline 5 | 142 | 14:16 | 14:16 | On Time | |
| Hebron | Airline 5 | 6142 | 14:00 | 14:00 | On Time | C5 |
| Hebron | Airline 2 | 6142 | 14:00 | 14:00 | On Time | C5 |
| Hebron | Airline 2 | 8859 | 14:00 | 14:00 | On Time | C5 |
| Houston | Airline 1 | 398 | 9:45 | 9:45 | Departed | A3 |
| Houston | Airline 3 | 727 | 12:10 | 12:10 | On Time | D16 |
| Houston | Airline 4 | 1727 | 12:10 | 12:10 | On Time | D16 |
| Houston | Airline 4 | 1567 | 13:25 | 13:25 | On Time | A9 |
| Houston | Airline 5 | 1527 | 15:35 | 15:44 | On Time | |
| Houston | Airline 5 | 2427 | 15:35 | 15:44 | On Time | |
| Indianapolis | Airline 3 | 2955 | 11:45 | 11:45 | On Time | |
| Islip | Airline 3 | 1756 | 11:05 | 11:05 | On Time | A10 |
| Islip | Airline 2 | 2105 | 13:05 | 13:05 | On Time | A1 |
| Jackson | Airline 1 | 2918 | 10:10 | 10:10 | On Time | B6 |
| Jackson | Airline 5 | 1915 | 15:25 | 15:42 | On Time | |
| Jacksonville | Airline 5 | 1220 | 14:55 | 15:09 | On Time | |
| Kansas City | Airline 4 | 151 | 12:50 | 12:50 | On Time | A3 |
| Lancaster | Airline 2 | 1523 | 11:00 | | On Time | |
| Lancaster | Airline 2 | 1525 | 13:35 | | On Time | |
| Little rock | Airline 4 | 2992 | 10:30 | 10:50 | Delayed 10:50 | B4 |
| Louisville | Airline 4 | 721 | 10:05 | 10:05 | On Time | B5 |
| Louisville | Airline 3 | 241 | 13:45 | 13:45 | On Time | B7 |
| Manchester | Airline 1 | 176 | 10:20 | 10:20 | On Time | A2 |

*micro FIDS*     Page 4 of 8     *By:* ARINC mperatyre is: 56° (feels like 56°)...The barometer is: 30.28 and the Hu

*FIG. 2A*

METHOD AND APPARATUS FOR THE COLLECTION, FORMATTING, DISSEMINATION, AND DIPLAY OF INFORMATION ON LOW-COST DISPLAY DEVICES

PRIORITY INFORMATION

This non-provisional application claims priority from U.S. Provisional Application Ser. No. 61/244,286, filed, Sep. 21, 2009 and U.S. Provisional Application Ser. No. 61/346,264, filed, May 19, 2010, the content of which are incorporated herein by reference in their entireties.

BACKGROUND OF THE DISCLOSED EMBODIMENTS

1. Field of the Disclosed Embodiments

The disclosed embodiments relate to the collection, formatting, dissemination, and display of information on low-cost display devices.

2. Introduction

Ready access to information is critical to many aspects of people's lives. The information required often exists in many places, but not always in the places the information would be most useful. As an example, the information about the arrival, departure, delay, or cancellation of various modes of travel (aircraft, train, bus, etc.) exists in various databases and other locations for specific uses, such as displaying flight information to visitors to an airport, but that information is typically confined to the airport premises, or the airport's or airline's web site. There are many other locations and potential consumers of the data, but the cost of distributing the data using conventional technology is too high due to expensive display technology, expensive communication links, etc.

SUMMARY OF THE DISCLOSED EMBODIMENTS

A display data management unit that receives and formats data and sends the formatted data to one or more low-cost display units for display to at least one of passengers and customers is disclosed and may include a communication interface that facilitates the sending and receiving of travel data, and a display content management unit that receives travel data through the communication interface that contains travel-related content from one or more data sources, determines which travel-related content is to be displayed on each particular low-cost display unit, determines in what format the travel-related content is to be displayed on each particular low-cost display unit, formats the travel-related content for display, and sends the formatted travel-related content to one or more low-cost display units through the communication interface for display to one of passengers and customers, wherein the travel-related content includes at least one of arrival information, departure information, subway schedules, terminal maps, station maps, location maps, advertisements, including text, video, and graphics, paging information, emergency information, current time and date information, weather information, and current news information.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIGS. 2A and 2B are diagrams of exemplary low-cost display units showing various content in accordance with a possible embodiment of the disclosure;

DESCRIPTION OF THE DISCLOSED EMBODIMENTS

Figure 1:
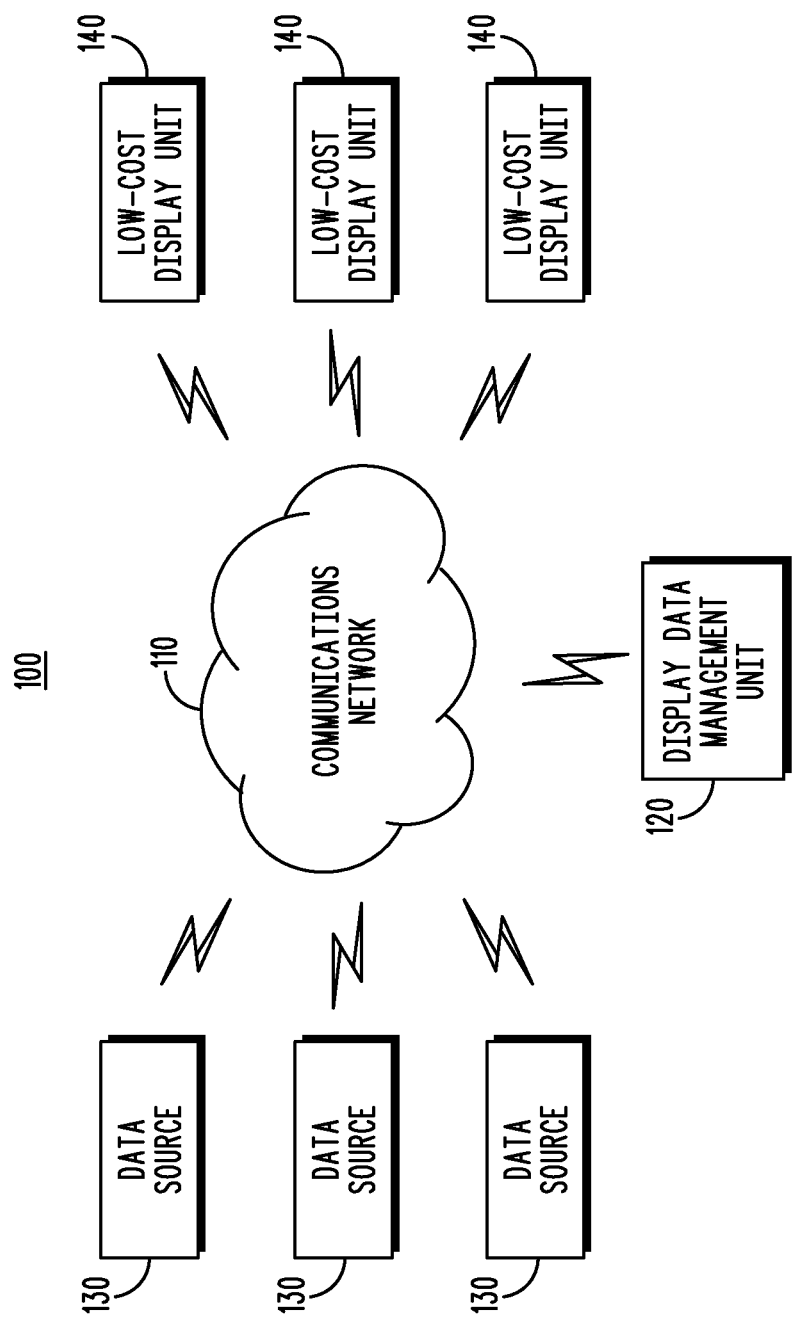
FIG. 1 is an exemplary diagram of a low-cost content display management environment in accordance with a possible embodiment of the disclosure.

Additional features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments will become more fully apparent from the following description and appended claims, or may be learned by the practice of the disclosed embodiments as set forth herein.

Various embodiments of the disclosed embodiments are discussed in detail below. While specific implementations are discussed, it should be understood that this is done for illustration purposes only. A person skilled in the relevant art will recognize that other components and configurations may be used without parting from the spirit and scope of the disclosed embodiments.

The disclosed embodiments comprise a variety of embodiments, such as a method and apparatus and other embodiments that relate to the basic concepts of the disclosed embodiments. Note that while this disclosure discusses aircraft, airline and travel-related uses for the disclosed embodiments, the disclosed embodiments are by no means limited to that area and may be applied to a wide variety of environment and uses.

The proposed disclosed system and method concerns a method and apparatus for the access, combination, formatting, dissemination, and display of various types of visual and/or audible information on various low-cost display technologies.

The low-cost display technologies may include display devices that are becoming more readily available on the market and with little or no modification to the hardware or operating system, can be connected via a wireless or wired network in order to receive information for display. The low-cost display devices may support network connectivity that is always connected, or only sometimes connected. For example, if a device has a constant network connection, information may be streamed in a continuous manner to the device from the server (using HTTP/HTTPS or other protocols over TCP/IP). If the device is only occasionally connected (e.g., in a mobile installation in which the vehicle is connected only during certain points of its journey), data may be refreshed during connectivity and the data may be displayed until a data validity expiration time is reached, or until new data is retrieved once connectivity is restored.

In addition, the data feeder service, in conjunction with the devices, may be configured to display information relevant to a particular portion of a journey. For example, a bus (such as an airport or rental car shuttle) traveling toward an airport may display flight departure information, while the same bus traveling away from the airport and perhaps toward the parking lot or rental car facility may display local traffic and weather conditions, advertisements, etc.

Data may be retrieved or be received from various sources over a public or private network by a central server process. The data retrieval and storage process may normalize (if necessary) the data and store it in a relational database, for example. The database may also contain profile information for displays containing details such as display size, screen resolution, firmware revision, types of data to display, etc.

The data formatting central server process may retrieve the data for a display or set of displays from the database, based upon the display profile, assemble data into information to be displayed. Information could be in the form of XML, RSS, static images, HTML pages, etc., for example.

The information broadcast central server process may receive information bound for displays and either transmit it to a display, or set of displays, or hold it until a display retrieves it (the system supports the concept of the display acting as a client or a server).

The information broadcast server process may also support other types of displays or devices, such as a software client on a personal computer, a web browser, or even a kiosk.

All aspects of the above processes and the system as a whole may be controlled by the system management console, through which data sources and display profiles may be added, modified, or deleted. Thus, a single (or distributed) information management unit may perform all or some of the above-described processes. One of the primary advantages of the disclosed embodiments is that it requires very little bandwidth, thus saving on processing capabilities.

FIG. 1 is an exemplary diagram of a low-cost content display management environment 100 in accordance with a possible embodiment of the disclosure. The low-cost content display management environment 100 may include a display data management unit 120, one or more data sources 130, and one or more display units 140, all connected through communications network 110. Note that although the connections in FIG. 1 are shown as a wireless configuration, one or more of these connections may also be wired.

Communications network 110 may represent any communications network used to communicate with other entities, including the Internet, an intranet, a radio network, a wireless network, etc. The one or more data sources 130 may be include one or more databases that contain information for dissemination to the display management unit 120 for formatting and transmitting to one or more display units 140 for display. The data sources 130 may also be the receiving and forwarding hub for real-time or near-real time information, such as flight/train status information, current weather conditions, etc.

The display management unit 120 may be any server, computer, processing device, personal digital assistant (PDA), or other similar device capable of storing and managing media publications and other documents and products. The one or more display devices 130 may represent any local or remote low-cost display device that is capable of receiving and displaying (or playing) data received from one or more data source 130 and formatted by the display management unit 120 to passengers and/or customer, such as an electrophoretic (e-paper) display, or other low-cost display unit, etc. If the display unit 140 is an e-paper display unit, the e-paper display unit is a low-cost display that may be viewed in lighting conditions similar to paper and may not require any backlighting, which reduces power cost and increases longevity of the display.

Figure 2B:
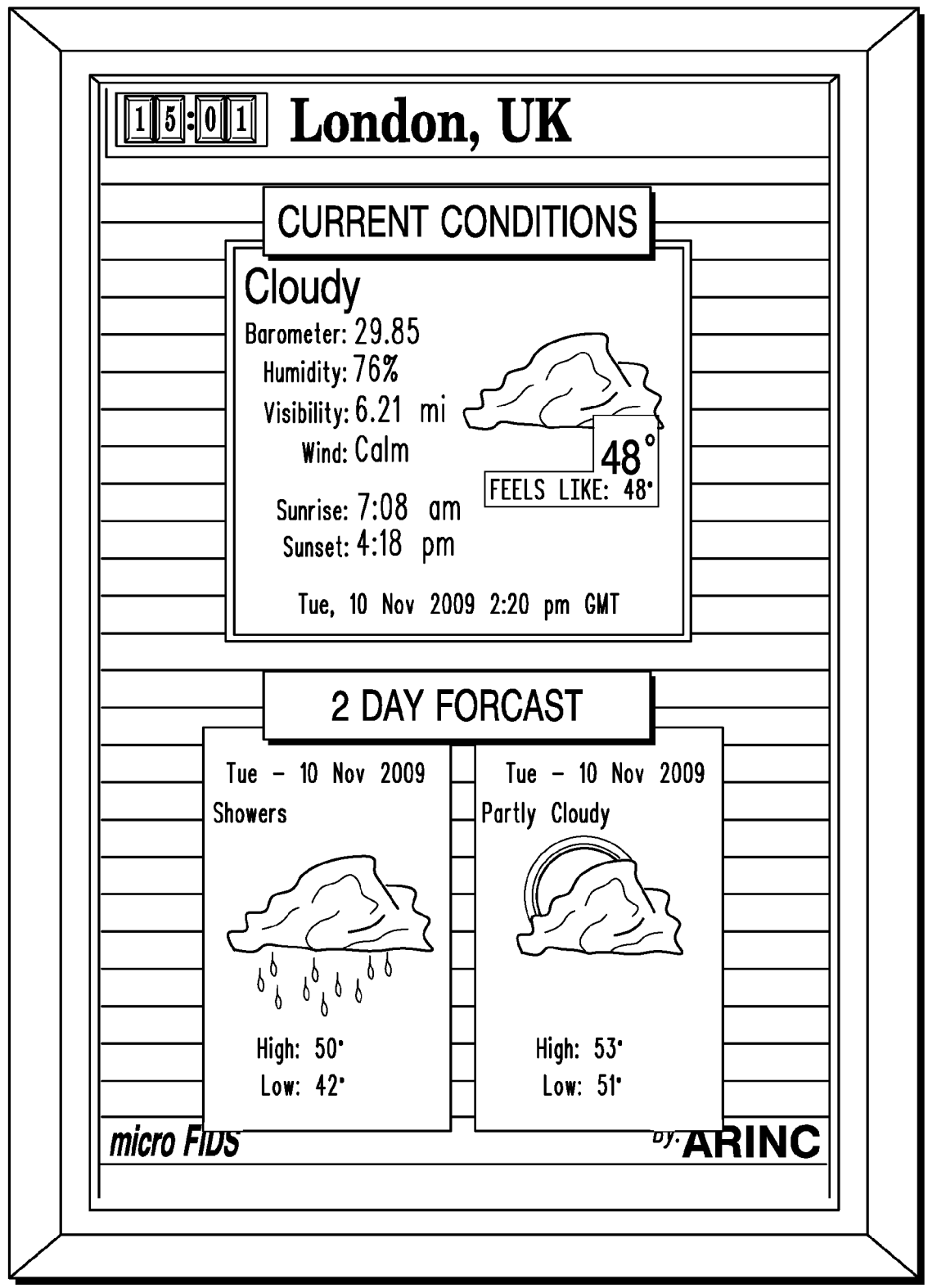

FIGS. 2A and 2B are diagrams of exemplary low-cost display units 140 showing various content in accordance with a possible embodiment of the disclosure. FIG. 2A is shown as a display for airline departures, while FIG. 2B is shown as a display of current weather at a departure/arrival city or a destination, for example. The low-cost display unit 140 may be any display unit that is significantly lower in cost compared to conventional display units used in travel-related circumstances (in airports terminals, train stations, bus depots, rental car locations, restaurants located in such areas, etc.) such as expensive LCD and plasma displays. For example, such low-cost display units 140 may be hundreds of dollars whereas conventional LCD and plasma displays used for the same purpose cost tens of thousands of dollars. The low-cost display unit 140 may also have reduced processing power and reduced features that are unneeded for its purpose. The low-cost display units 140 of the type discussed in the disclosed embodiments also use reduced amounts of power, thus saving the users significantly on their electric bills. In this manner, the low-cost display units 140 and display data management unit of the disclosed embodiments may reduce airport terminal costs by the millions.

The low-cost display unit 140 may receive a wide variety of information for display, such as travel information (e.g., arrival and departure information (for any mode of transportation), train schedules, cruise stops/schedules, subway maps or schedules, bus schedules, area/location/city maps, terminal maps, gate or port locations, rental car information (e.g., car locations numbers and/or maps, bus stop location, terminal location, etc.), baggage information (location, bag identification, etc.), advertisements, hotel or restaurant information, weather information (e.g., forecast or current weather information at current location, various destinations, etc.).

Figure 3:
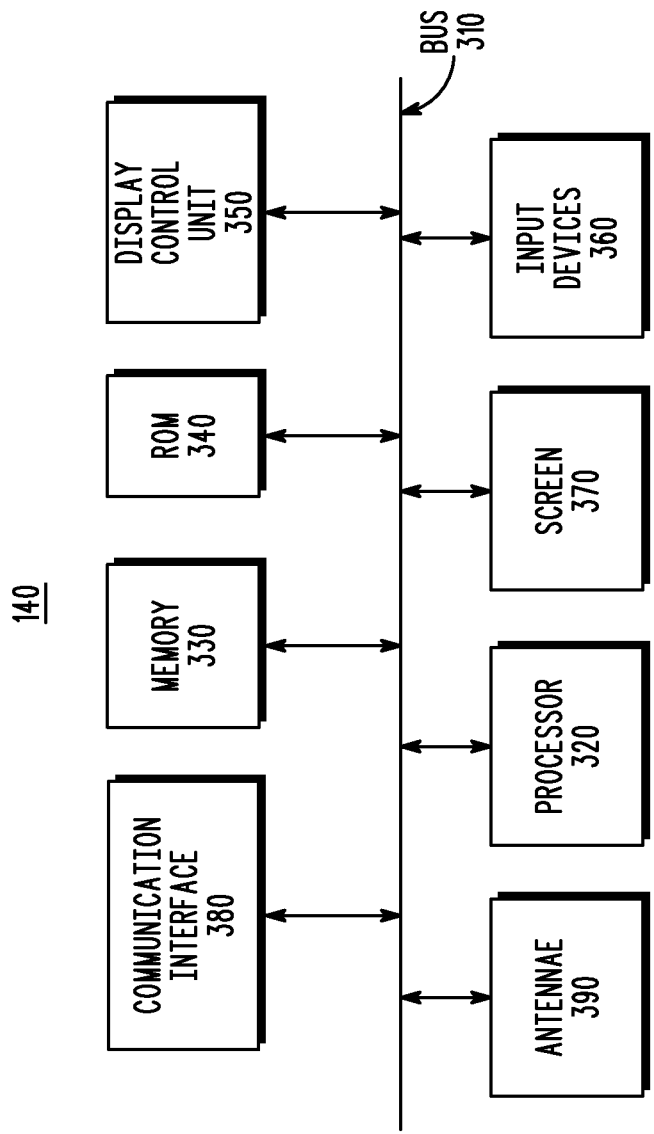
FIG. 3 is a block diagram of an exemplary low-cost content display unit in accordance with a possible embodiment of the disclosure.

FIG. 3 is a block diagram of an exemplary low-cost content display unit 140 in accordance with a possible embodiment of the disclosure. The exemplary low-cost content display unit 140 may include a bus 310, a processor 320, a memory 330, a read only memory (ROM) 340, a display control unit 350, input devices 360, screen 370, a communication interface 380, and antennae 390.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Memory 330 may also represent any type of storage media or media drive, such as, for example, magnetic or optical recording media and its corresponding drive.

Input device 360 may include one or more conventional mechanisms that may permit a user to input information to the low-cost content display unit 140, such as a keyboard, a mouse, a pen, a voice recognition device, etc.

Communication interface 380 may include any transceiver-like mechanism that enables the low-cost content display unit 140 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. The antennae 390 may represent any antenna, modem, or other device that works in conjunction with the communication interface that facilitates the reception (and sending) of electronic signals, such as radio frequency (RF), Wi-Fi, wireless communication, remote control, infra-red, etc.

The display control unit 350 may control the operation of the display unit 140, including the reception and display of data source content for display, such as travel-related content as discussed above in relation to FIGS. 2A and 2B, for example. The display control unit 350 may receive travel data through the communication interface 380 that may contains travel-related content from one or more data sources 130. The travel-related content may include arrival information, departure information, subway schedules, terminal maps, station maps, location maps, advertisements, paging information, emergency information, current time and date information, and weather information, for example. The display control unit 350 may then display the received travel-related content on the display screen 370.

The display control unit 350 may perform such functions in response to processor 320 by executing sequences of instructions contained in a computer-readable medium, such as, for example, memory 330, a magnetic disk, or an optical disk. Such instructions may be read into memory 330 from another computer-readable medium, such as a storage device, or from a separate device via communication interface 380.

Figure 4:
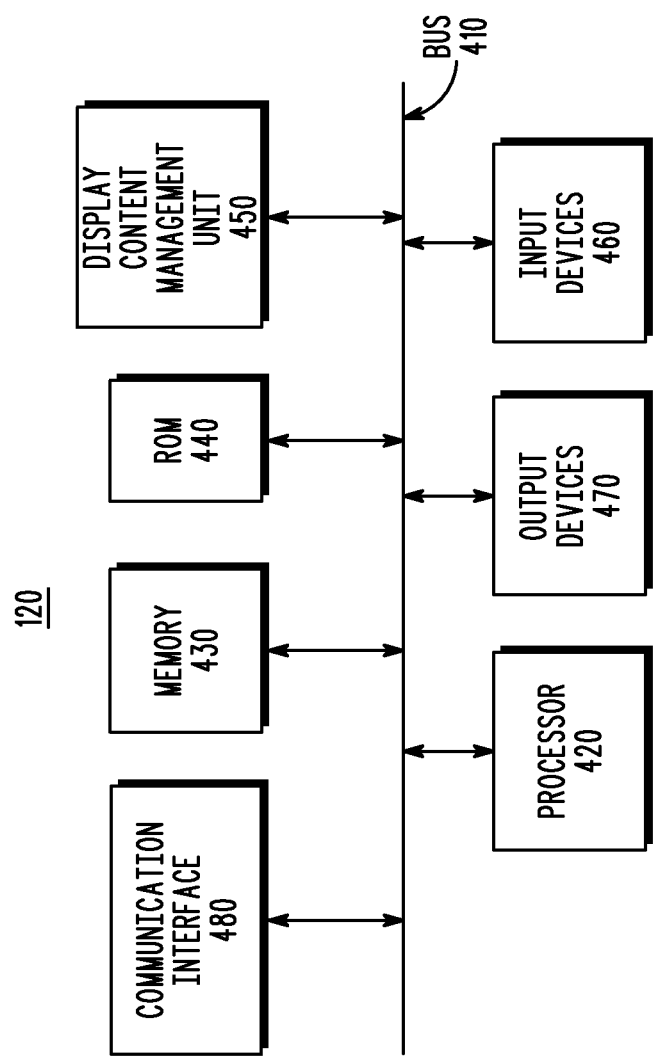
FIG. 4 is a block diagram of an exemplary display management unit in accordance with a possible embodiment of the disclosure.

FIG. 4 is a block diagram of an exemplary display data management unit 120 in accordance with a possible embodiment of the disclosure. The exemplary display data management unit 120 may include a bus 410, a processor 420, a memory 430, a read only memory (ROM) 440, a display content management unit 450, input devices 460, output devices 470, and a communication interface 480. Bus 410 may permit communication among the components of the display data management unit 120.

Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. ROM 440 may include a conventional ROM device or another type of static storage device that stores static information and instructions for processor 420. Memory 430 may also represent any type of storage media or media drive, such as, for example, magnetic or optical recording media and its corresponding drive.

Input device 460 may include one or more conventional mechanisms that may permit a user to input information to the display data management unit 120, such as a keyboard, a mouse, a pen, a voice recognition device, etc. Output device 470 may include one or more conventional mechanisms that output information to the user, including a display, a printer, one or more speakers, or a medium, such as a memory, or a magnetic or optical disk and a corresponding disk drive.

Communication interface 480 may include any transceiver-like mechanism that enables the display content management unit 450 to communicate via a network. For example, communication interface 480 may include a modem, or an Ethernet interface for communicating via a local area network (LAN). Alternatively, communication interface 480 may include other mechanisms for communicating with other devices and/or systems via wired, wireless or optical connections.

The display data management unit 120 may perform such functions in response to processor 420 by executing sequences of instructions contained in a computer-readable medium, such as, for example, memory 430, a magnetic disk, or an optical disk. Such instructions may be read into memory 430 from another computer-readable medium, such as a storage device, or from a separate device via communication interface 480.

The display data management unit 120 and the low-cost display unit 140 illustrated in FIGS. 1-4 and the related discussion are intended to provide a brief, general description of a suitable computing environment in which the disclosure may be implemented. Although not required, the disclosure will be described, at least in part, in the general context of computer-executable instructions, such as program modules, being executed by the display data management unit 120 and the display unit 140, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the operation of the display content management unit 450 and the display content management unit 450 process will be described below in FIG. 5 in relation to the block diagrams shown in FIGS. 1-4.

Figure 5:
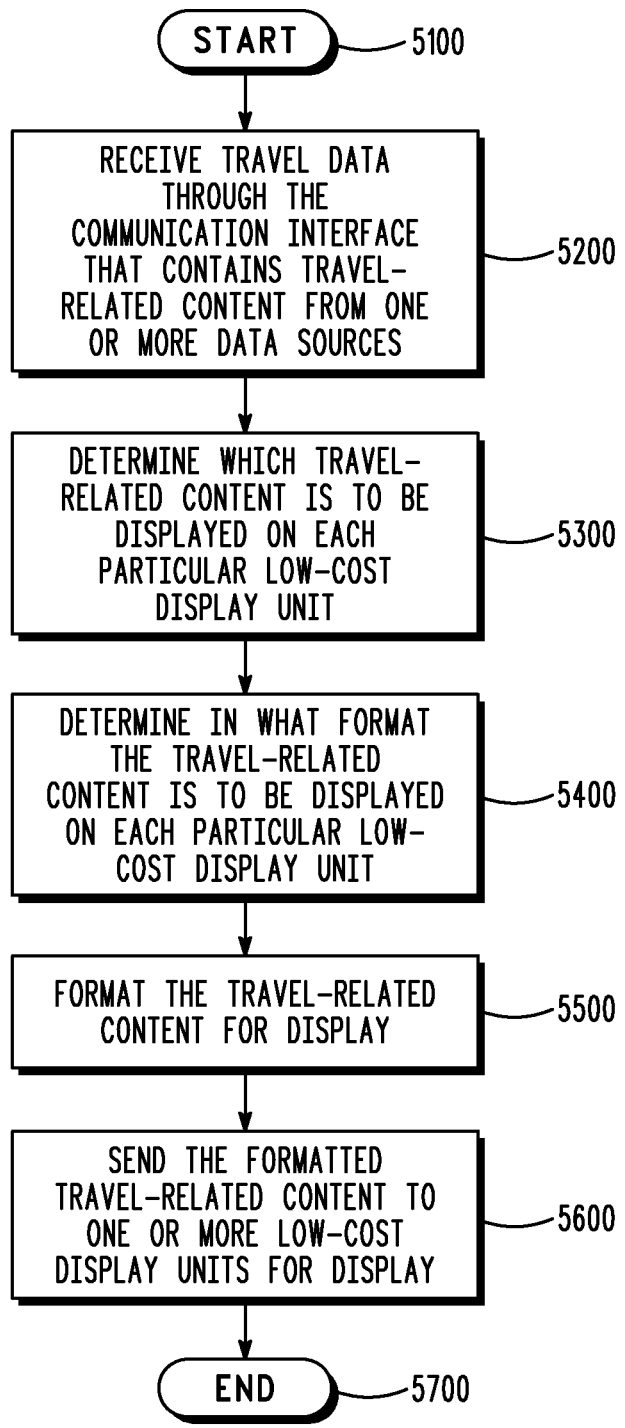
FIG. 5 is an exemplary flowchart of a low-cost content display data management process in accordance with one possible embodiment of the disclosure.

FIG. 5 is an exemplary flowchart of a low-cost content display data management process in accordance with one possible embodiment of the disclosure. The process begins at step 5100 and continues to step 5200 where the display content management unit 450 may receive travel data through the communication interface 480 that contains travel-related content from one or more data sources 130. The travel-related content may include arrival information, departure information, subway schedules, terminal maps, station maps, location maps, advertisements, paging information, emergency information, current time and date information, weather information, or any other possible travel related information.

At step 5300, the display content management unit 450 may determine which travel-related content is to be displayed on each particular low-cost display unit 140. At step 5400, the display content management unit 450 may determine in what format the travel-related content is to be displayed on each particular low-cost display unit 140. In formatting the travel-related data content, the display content management unit 450 may determine where on the screen of each particular display unit the travel-related content is to be displayed. At step 5500, the display content management unit 450 may format the travel-related content for display (e.g., XML, etc.). At step 5600, the display content management unit 450 may send the formatted travel data to one or more low-cost display units 140 through the communication interface 480 for display to passengers, customers, etc. The travel-related content may be sent to one or more of the low-cost display units 140 by wired or wirelessly technology, such as Wi-Fi, RF, modem, 802, internet, intranet, or in accordance with another possible wired or wireless method or standard. The process may then go to step 5700 and end.

Figure 6A:
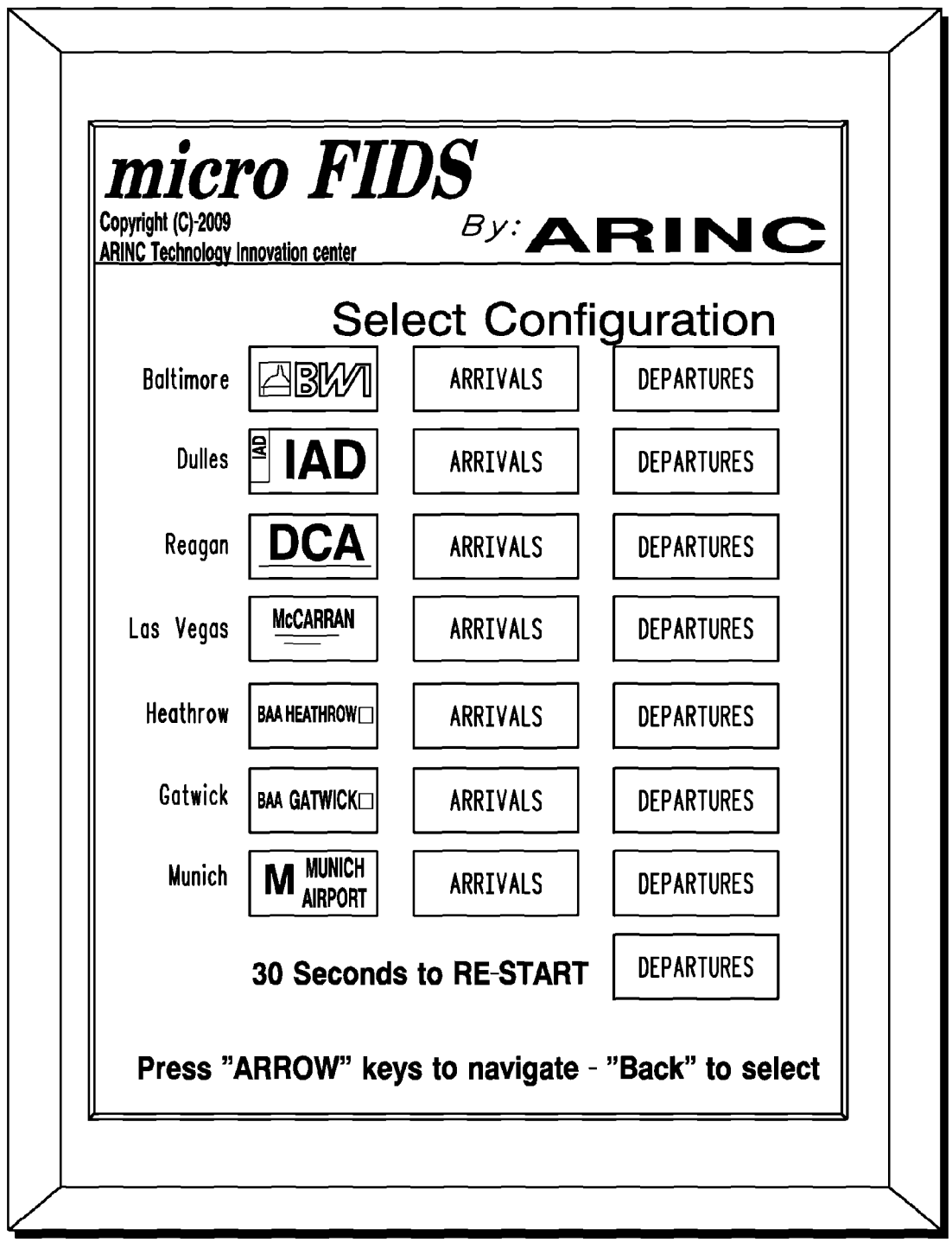
FIG. 6A is an exemplary screenshot of a possible local configuration interface for the low-cost content display units and FIG. 6B is a possible remote control for interacting with the possible configuration interface for the low-cost content display units in accordance with a possible embodiment of the disclosure.

FIG. 6A is an exemplary screenshot of a possible local configuration interface 600 for the low-cost content display units 140 in accordance with a possible embodiment of the disclosure. The local configuration interface 600 may allow a user to locally configure the low-cost content display units 140 to display a particular venue (e.g., a particular airport (e.g., Baltimore Washington International Airport (BWI)), train station, bus station, etc.), with particular information, such as arrival, departure, weather, etc. The low-cost content display units 140 may be configured to display one category of travel-related information, such as departures, or may be configured to alternate the display between arrivals, departures, weather, and one or more advertisements. The low-cost content display units 140 may also be configured to display multiple amounts of information of the same screen, such as weather and an advertisement, for example.

In addition, if a low-cost content display unit 140 is placed in a restaurant, for example, the display may also be configured to display any specials, entertainment scheduled, etc. If a low-cost content display unit 140 is placed in a rental car bus, the parking spot of rental cars for VIP customers may also be displayed either on a single display or alternating with arrival and/or departure information, for example. The display may be control by a local computer, a touch screen (if the low-cost content display units 140 are so designed), or a remote control, for example.

Figure 6B:
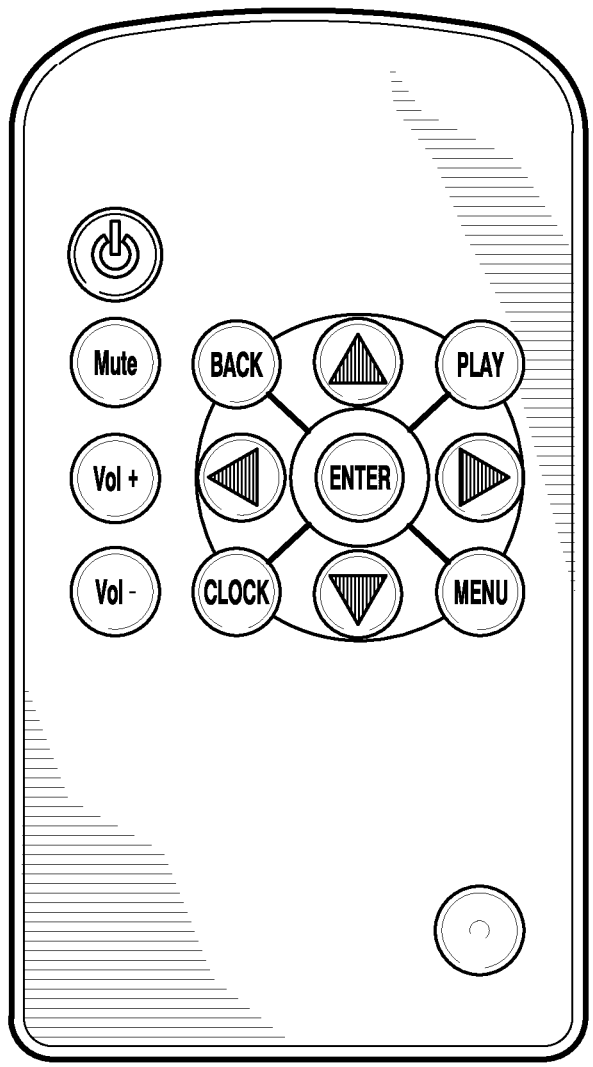

FIG. 6B is a possible remote control 610 for interacting with the possible configuration interface for the low-cost content display units 140 in accordance with a possible embodiment of the disclosure. The remote control 610 may contain a plurality of buttons (e.g., on/off, up down arrows, paging change, menu, etc.) to facilitate the interaction with a particular low-cost content display unit 140 or a bank of low-cost content display units 140. In this manner, the remote control 610 may facilitate selecting display options (e.g., content, appearance, etc.) from menus that may appear on the low-cost content display unit 140.

Figure 7A:
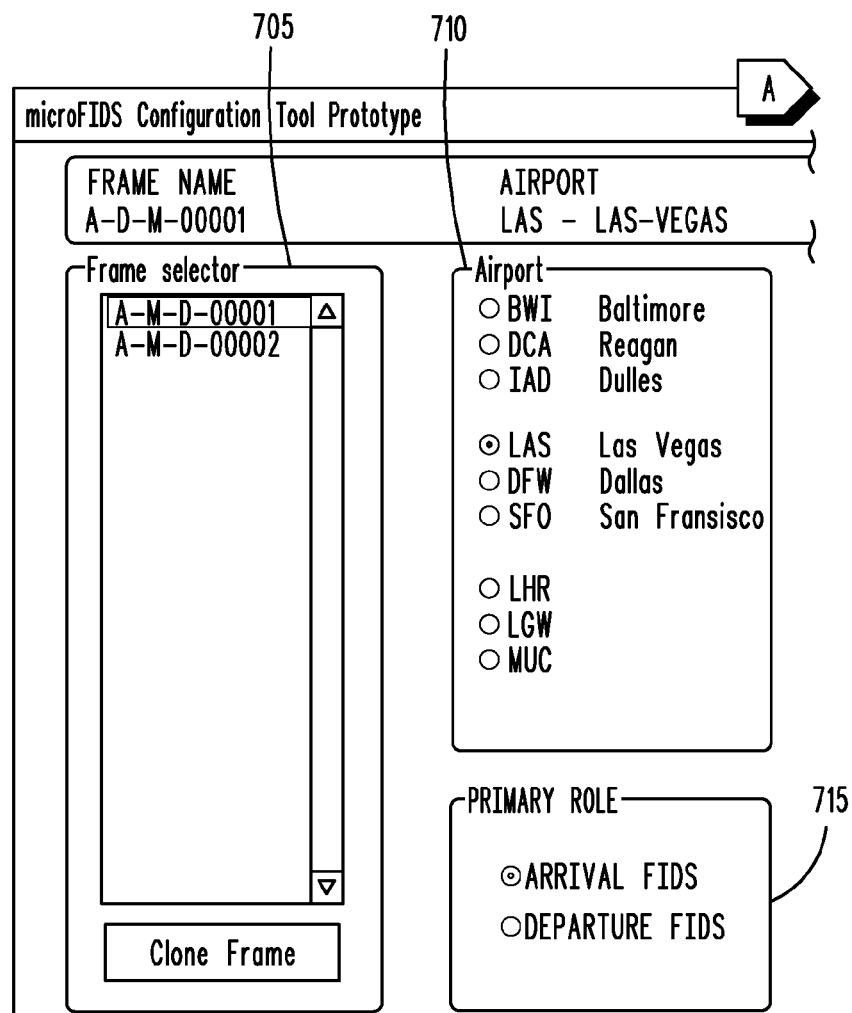
FIG. 7 is an exemplary screenshot of a remote configuration interface for the low-cost content display units in accordance with a possible embodiment of the disclosure.
Figure 7B:
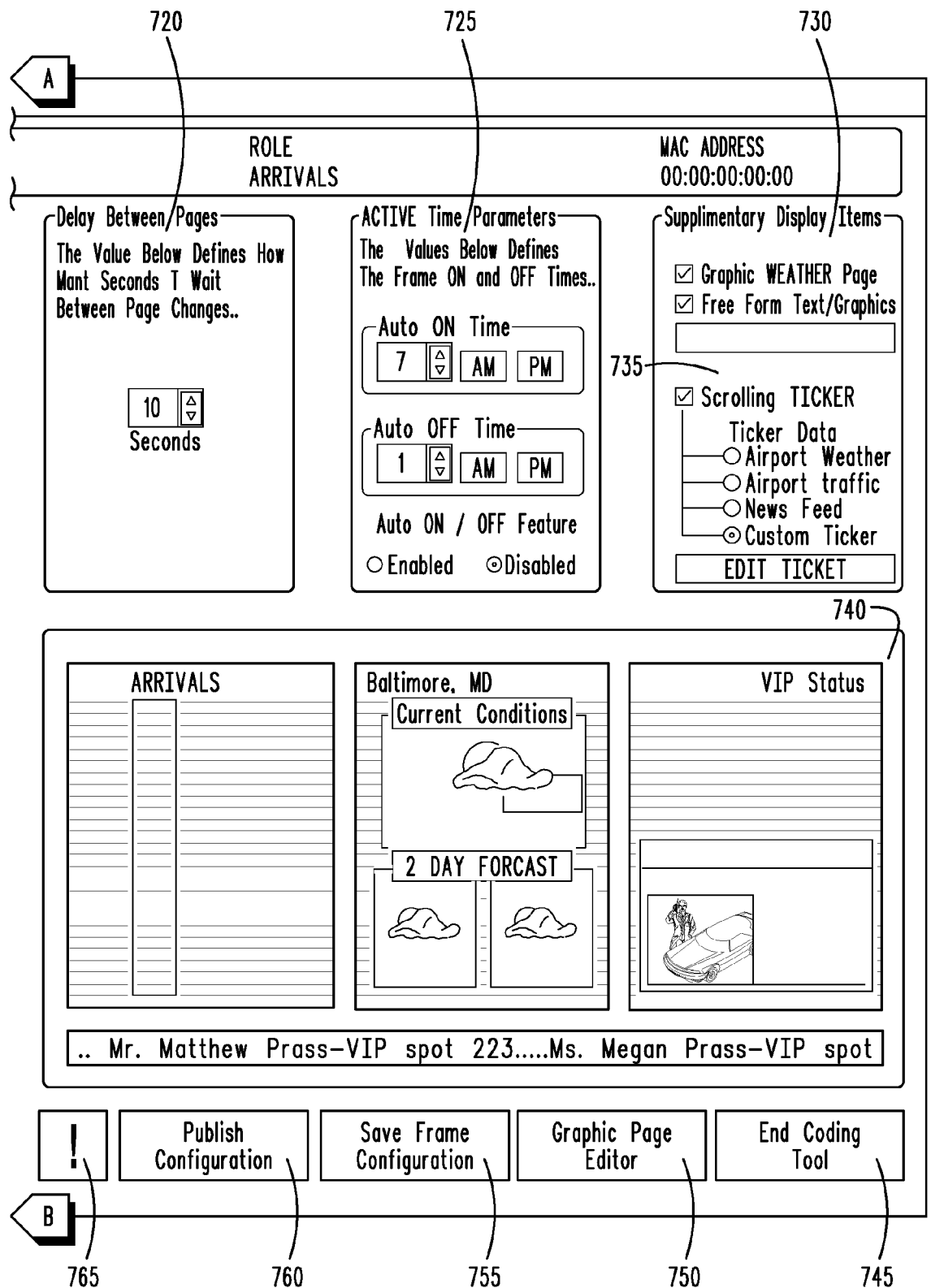

FIG. 7 is an exemplary screenshot of a remote configuration interface 700 for the low-cost content display units 140 in accordance with a possible embodiment of the disclosure. The remote configuration interface 700 may be a computer, server, PDA, application device, processing device, etc. based interface which may be a stand-alone application or it may be part of a software package, for example. The remote configuration interface 700 may include menus and selection boxes that may facilitate the remote (or local) configuration parameters and creation of individual display unit profiles or display unit bank profiles for one or more low-cost content display units 140. These profiles may determine what content each display unit 140 or display unit bank will display (e.g., arrival information, departure information, weather, ticker, etc.) and how the content will be presented (e.g., position of content on the screen, delay between showing certain information, etc.).

In the example shown in FIG. 7, the remote configuration interface 700 may include a frame configuration selection box 705, a venue configuration selection box 710, a content configuration selection box 715, a delay time configuration selection box 720, an on/off time configuration selection box 725, a weather page configuration selection box 730, a ticker configuration selection box 735, a display preview box 740, an end configuration box 745, a graphic advertisement configuration selection box 750, a save configuration selection box 755, an upload configuration selection box 760, and a help configuration selection box 765. For the purposes of the disclosed embodiments, a user may be a system operator, a customer, an information technology person, owner, travel terminal worker, or any other person that may configure the content and/or appearance of one or more low-cost display units 140.

The frame configuration selection box 705 may allow a user to select a particular low-cost display unit 140 or display bank to configure at one or more particular venues For example, at an airport, a particular display unit 140 or display bank may be identified and selected that may be in a particular terminal gate area, a restaurant, bar, etc. However, the configuration may be such that all display units in a particular airport may be selected and configured display the same information or page through multiple display pages. The frame configuration selection box 705 may also allow selection of individual screens for an individual low-cost display unit 140 should the low-cost display unit 140 be configured to display multiple alternating screens.

The venue configuration selection box 710 may allow a user to select which airport, train station, bus depot, cruise line and/or port, etc. the display unit 140 or bank of display units on which the particular information may be displayed. The content configuration selection box 715 may be used by a user to select the information content of a particular low-cost display unit 140 or display bank, such as one or more of arrival, departure, weather, advertisement, restaurant menu/specials, etc.

The delay time configuration selection box 720 may allow the user to select the delay time between page changes on low-cost display units 140 that will alternate to show more than one page at various intervals. The on/off time configuration selection box 725 may used by a user to select whether a low-cost display unit 140 is to be automatically turned on and/or off and at what time a display unit 140 or display unit bank will automatically turned on and/or off.

The weather/advertisement page configuration selection box 730 may be used to select if a weather and/or graphic advertisement page is to be displayed and the location of the weather to be displayed, such as at the airport, in a city, one or more destination, etc. or to select a particular advertisement and/or advertiser to be displayed. The ticker configuration selection box 735 may be used to select a display of traffic, news, custom ticker (with paging, rental car location, news, special announcements, or other information. The display preview box 740 may be used to display a preview of one or more display units' display page and configuration prior to finalizing and sending to the display unit 140 or display unit bank.

The end configuration box 745 may used end the configuration process for one or more display units 140 and may enable another display unit 140 or display bank to be configured. The graphic advertisement configuration selection box 750 may be used to edit a graphic advertisement page. The save configuration selection box 755 may be used to save a display unit's or display unit bank's configuration.

The upload configuration selection box 760 may be used to upload or publish a configured display unit's 140 or display unit bank's page to be displayed. The help configuration selection box 765 may be used to receive help from a local help database and/or program, or from a remote help center.

Figure 8:
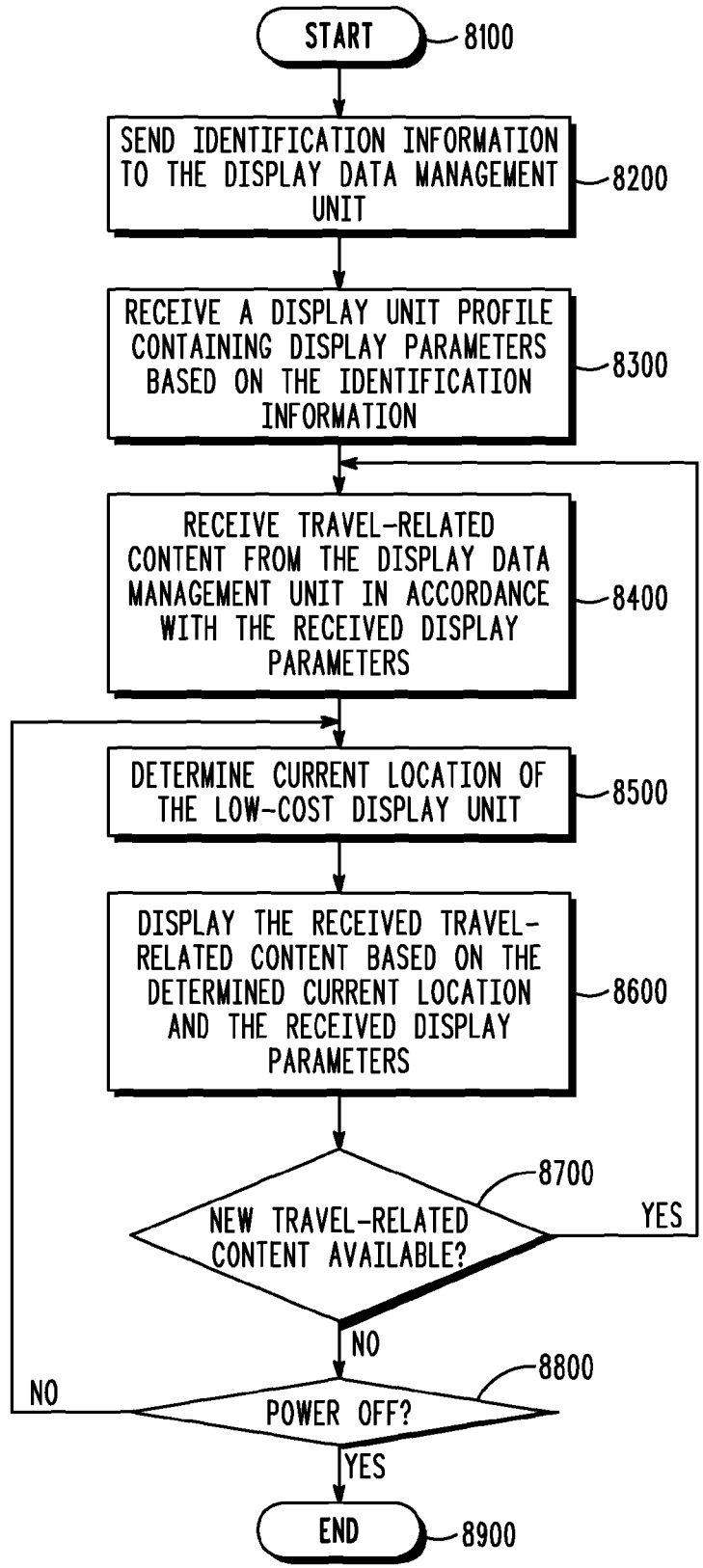
FIG. 8 is an exemplary flowchart of a low-cost content display unit process in accordance with one possible embodiment of the disclosure.

FIG. 8 is an exemplary flowchart of a low-cost content display unit process in accordance with one possible embodiment of the disclosure. The process may begin at step 8100 and may continue to step 8200 where the display control unit 350 may send identification information to the display data management unit 120 through the communication interface 380. This identification information indicates to the display data management unit 120 where the low-cost display unit 140 is located (e.g., at which airport, station, etc.), and where within that location (e.g., terminal, gate, restaurant, etc.), and possibly information about the display unit itself (e.g., size, type, model, etc.). At step 8300, the display control unit 350 may receive a display unit profile containing display parameters based on the identification information through the communication interface 380. These parameters may be those described in detail above in FIG. 7, for example.

At step 8400, the display control unit 350 may receive travel-related content from the display data management unit 120 in accordance with the received display parameters through the communication interface 380. The travel-related content may be received as a result of the display unit 140 requesting the content (the content is pulled from the display data management unit 120) or by the display data management unit 120 sending the content on its on volition (the content is pushed to the display unit 140). The travel-related content may include at least one of arrival information, departure information, subway schedules, terminal maps, station maps, location maps, advertisements, paging information, emergency information, current time and date information, or weather information, for example.

At step 8500, the display control unit 350 may determine the current location of the low-cost display unit 140. The location may be determined using and known location technology, such as Global Positioning System (GPS), Radio Frequency Identification (RFID), etc. For example, the display unit 140 location may be on a rental car bus heading to the airport from the rental car facility. At step 8600, the display control unit 350 may display the received travel-related content based on the determined current location and the received display parameters. For example, the display unit 140 location may be on a rental car bus heading to the airport from the rental car facility and the received display parameters may require that the display show departure information on the way to the airport and show VIP rental car location information and/or current weather information on the way to the rental car facility.

At step 8700, the display control unit 350 may determine whether new travel-related content is available from the display data management unit 120, such as updated flight information. This update may be performed on-demand or one a periodic basis, for example. If the display control unit 350 determines that new travel-related content is available from the display data management unit 120, the process returns to step 8400 and the display control unit 350 may receive travel-related content from the display data management unit 120 in accordance with the received display parameters through the communication interface 380, determine the current location of the low-cost display unit 140 and display travel-related content based on the determined current location and the received display parameters.

At step 8800, the display control unit 350 may determine whether a power off signal has been received. If the display control unit 350 determines that a power off signal has not been received, the process returns to step 8500. If the display control unit 350 determines that a power off signal has been received, the process may then go to step 8900 and end.

Embodiments within the scope of the present disclosed embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosed embodiments are part of the scope of the disclosed embodiments. For example, the principles of the disclosed embodiments may be applied to each individual user where each user may individually deploy such a system. This enables each user to utilize the benefits of the disclosed embodiments even if any one of the large number of possible applications do not need the functionality described herein. In other words, there may be multiple instances of the disclosed system each processing the content in various possible ways. It does not necessarily need to be one system used by all end users. Accordingly, the appended claims and their legal equivalents should only define the disclosed embodiments, rather than any specific examples given.

We claim:

1. A display data management unit, comprising:
a communication interface that facilitates the sending and receiving of travel data; and
a display content management unit that
receives travel data through the communication interface, the received travel data containing travel-related content from a plurality of data sources,
requests identification information for a low-cost display unit through the communication interface,
receives a display unit profile containing display parameters for the low-cost display unit based on the identification information through the communication interface,
determines which elements of the travel-related content are to be separately displayed on each particular low-cost display unit of a plurality of low-cost display units,
determines in what format the elements of the travel-related content are to be displayed on each particular low-cost display unit,
formats the elements of the travel-related content for display on each particular low-cost display unit, and
sends the formatted travel-related content to each particular low-cost display unit through the communication interface for display,
wherein:
the elements of the travel-related content include at least one of arrival information, departure information, subway schedules, terminal maps, station maps, location maps, advertisements, paging information, emergency information, current time and date information, and weather information,
in formatting the elements of travel-related data content, the display content management unit determines where on a screen of each particular low-cost display unit individual elements of the travel-related content are to be displayed, and
the plurality of low-cost display units have integrated processors and are not liquid-crystal displays (LCDs) or plasma displays,
wherein two or more of the plurality of low-cost display units are grouped together as a display bank, and wherein the display content management unit configures the elements of the travel-related content to be different for each low-cost display unit in the display bank.

2. The display data management unit of claim 1, wherein the elements of the travel-related content are sent to one or more of the plurality of low-cost display units wirelessly.

3. The display data management unit of claim 1, wherein at least one of the plurality of low-cost display units is controlled locally by a remote control unit.

4. The display data management unit of claim 1, wherein the display data management unit is one of a server, a computer, and a processing device.

5. A non-transitory computer-readable medium storing instructions that, when executed by a computing device, cause the computing device to execute the steps of a method comprising:
receiving travel data through a communication interface, the received travel data containing travel-related content from a plurality of data sources, wherein elements of the travel-related content include at least one of arrival information, departure information, subway schedules, terminal maps, station maps, location maps, advertisements, paging information, emergency information, current time and date information, and weather information;
requesting identification information for a low-cost display unit through the communication interface,
receiving a display unit profile containing display parameters for the low-cost display unit based on the identification information through the communication interface,
determining which of the elements of the travel-related content are to be displayed on each particular low-cost display unit of a plurality of low-cost display units;
determining in what format the elements of the travel-related content are to be displayed on each particular low-cost display unit and where on a screen of each particular low-cost display unit the elements of the travel-related content are to be displayed;
formatting the elements of the travel-related content for display on each particular low-cost display unit; and
sending the formatted travel-related content to each particular low-cost display unit through the communication interface for display,
wherein the plurality of low-cost display units have integrated processors and are not liquid-crystal displays (LCDs) or plasma displays,
wherein two or more of the plurality of low-cost display units are grouped together as a display bank, and wherein the computing device further configures the elements of the travel-related content to be different for each low-cost display unit in the display bank.

6. The non-transitory computer-readable medium of claim 5, wherein the elements of the travel-related content are sent to one or more of the plurality of low-cost display units wirelessly.

7. The non-transitory computer-readable medium of claim 5, wherein at least one of the low-cost display units is controlled locally by a remote control unit.

8. The non-transitory computer-readable medium of claim 5, wherein the computing device is a display data management unit, the display data management unit being one of a server, a computer, and a processing device.

9. A method for providing formatted data to a plurality of low-cost display units for display, comprising:
receiving, with a processor, travel data through a communication interface, the travel data containing travel-related content from a plurality of data sources, wherein elements of the travel-related content include at least one of arrival information, departure information, subway schedules, terminal maps, station maps, location maps, advertisements, paging information, emergency information, current time and date information, and weather information;
requesting, with the processor, identification information for at least one low-cost display unit among the plurality of low-cost display units through the communication interface,
receiving, with the processor, a display unit profile containing display parameters for the at least one low-cost display unit based on the identification information through the communication interface,
determining, with the processor, which of the elements of the travel-related content are to be displayed on each particular low-cost display unit of the plurality of low-cost display units;
determining, with the processor, in what format the elements of the travel-related content are to be displayed on each particular low-cost display unit and where on a screen of each particular low-cost display unit the elements of the travel-related content are to be displayed, formatting, with the processor, the elements of the travel-related content for display; and sending the formatted travel-related content to each particular low-cost display unit through the communication interface for display, wherein the plurality of low-cost display units have integrated processors and are not liquid-crystal displays (LCDs) or plasma displays, wherein two or more of the plurality of low-cost display units are grouped together as a display bank, and wherein the processor further configures the elements of the travel-related content to be different for each low-cost display unit in the display bank.

10. The method of claim 9, wherein the elements of the travel-related content are sent to each particular low-cost display unit wirelessly.

11. The method of claim 9, wherein at least one of the low-cost display units is controlled locally by a remote control unit.

12. The method of claim 9, wherein the processor is one of a server, a computer, and a processing device.

13. A low-cost display unit, comprising:
an integrated processor;
a communication interface that facilitates receiving of travel-related content from a display management unit that communicates with and sends formatted elements of the travel-related content separately to a plurality of low-cost display units;
a display control unit that
sends identification information for the low-cost display unit to the display data management unit through the communication interface,
receives a display unit profile containing display parameters for the low-cost display unit based on the identification information through the communication interface,
receives the elements of the travel-related content from the display data management unit in accordance with the received display parameters through the communication interface,
determines a current location of the low-cost display unit,
displays the received elements of the travel-related content based on the determined current location and the received display parameters, and
determines whether updated elements of travel-related content are available from the display data management unit,
wherein when the display control unit determines that updated elements of travel-related content are available from the display data management unit, the display control unit (1) updates the current location of the low-cost display unit and (2) displays the updated elements of travel-related content based on the updated current location and the received display parameters,
wherein the elements of the travel-related content include at least one of arrival information, departure information, subway schedules, terminal maps, station maps, location maps, advertisements, paging information, emergency information, current time and date information, and weather information,
in formatting the travel-related data content, the display content management unit determines where on the screen of each particular display unit individual elements of the travel-related content is to be displayed, and
the low-cost display unit is not a liquid-crystal displays (LCDs) or plasma display,
wherein two or more of the plurality of low-cost display units are grouped together as a display bank, and wherein the display content management unit configures the elements of the travel-related content to be different for each low-cost display unit in the display bank.

14. A method of displaying elements of travel-related content on a plurality of low-cost display units, comprising:
sending identification information for each of the plurality of low-cost display units from an integrated processor in the each of the plurality of low-cost display units to a display data management unit;
receiving a display unit profile containing display parameters for the each of the plurality of low-cost display units based on the identification information;
receiving formatted elements of the travel-related content from the display data management unit in accordance with the received display parameters;
determining a current location of each of the low-cost display units;
displaying the received formatted elements of the travel-related content based on the determined current location and the received display parameters for the each of the low-cost display units;
determining whether updated elements of the travel-related content are available from the display data management unit,
wherein when it is determined that the updated elements of the travel-related content are available from the display data management unit, the method further comprises:
determining an updated current location of the each of the low-cost display units; and
displaying the updated elements of the travel-related content based on the determined updated current location and the received display parameters for the each of the low-cost display units,
wherein the elements of the travel-related content include at least one of arrival information, departure information, subway schedules, terminal maps, station maps, location maps, advertisements, paging information, emergency information, current time and date information, and weather information, and in formatting the travel-related data content, the display content management unit determines where on the screen of each particular display unit individual elements of the travel-related content is to be displayed,
wherein two or more of the plurality of low-cost display units are grouped together as a display bank, and wherein the display content management unit configures the elements of the travel-related content to be different for each low-cost display unit in the display bank.

* * * * *